United States Patent [19]
Stellwagen

[11] Patent Number: 6,092,364
[45] Date of Patent: Jul. 25, 2000

[54] GAS MOTOR

[75] Inventor: Karl Stellwagen, Mannheim, Germany

[73] Assignee: Motoren-Werke Mannheim AG, Mannheim-Neckarstadt, Germany

[21] Appl. No.: 09/135,345

[22] Filed: Aug. 17, 1998

[30] Foreign Application Priority Data

Aug. 20, 1997 [DE] Germany .................. 297 14 887 U

[51] Int. Cl.$^7$ ........................................ F02C 3/20
[52] U.S. Cl. ................... 60/39.463; 137/114; 48/127.1
[58] Field of Search ................... 60/39.463; 137/88, 137/89, 93, 114; 48/127.1

[56] References Cited

U.S. PATENT DOCUMENTS 3,762,428   10/1973   Beck et al. .................. 137/114

FOREIGN PATENT DOCUMENTS 15 76 321   4/1990   Germany .
41 37 573   5/1993   Germany .

Primary Examiner—Noah P. Kamen
Attorney, Agent, or Firm—Nexsen Pruet Jacobs & Pollard, LLP; Charles L. Schwab, Esq.

[57] ABSTRACT

This invention relates to a gas motor fuel delivery system having a gas mixer, which has a through passage having a gas mixing zone in which there is a suction dependent on the flow velocity prevailing there. The through passage of the gas mixer is part of a lean-gas line (2). Rich gas is delivered to the gas mixing zone of the gas mixer and admixed with the lean qas to raise the heating value of the latter to a value suitable for the motor.

14 Claims, 1 Drawing Sheet

GAS MOTOR

TECHNICAL FIELD

This invention relates to a gas motor having a gas mixer, which has a through line with a gas mixing zone in which there is a suction dependent on the flow velocity prevailing there and into which gas mixing zone an auxiliary line opens.

BACKGROUND OF THE INVENTION

The methane content in fuel gas in landfills decreases with increasing time in service. Currently, gas motor operation must be halted if the methane content drops below a minimum value of approximately 35 to 40%, which is the content necessary for combustion in the gas motor. As a consequence, the pollutant-rich landfill gas with methane content below the minimum value, can no longer be disposed of or utilized as a fuel for engines or motors. The landfill gas produced with low methane content must be burned at high temperature in a special flare in order to minimize the pollutant discharge. This holds true for all lean gases whose heating value lies below the minimum value required for operation with a gas motor.

Boosting of the heating value of lean gases by means of the admixture of rich gases, such as natural gas, is not practiced at present because known industrial gas mixing systems would require an excessively large investment.

German patent document DE-OS 15 76 321 describes an apparatus which allows operation of a gas motor with various gases having various heating values. Upon a change of gas heating value, the gas pressure is changed in inverse proportion to the heating value of the gas being fed to the gas motor. Use of such apparatus presupposes maintenance of a minimum heating value of the gases used. Mixing of the two types of gases occurs only briefly at the changeover of one gas to another gas.

German patent document DE-A 41 37 573 discloses a gas motor having a gas mixer designed as a venturi mixer with adjustable venturi body.

OBJECTS AND SUMMARY OF THE INVENTION

It is an object of the invention to create a gas motor that, at low manufacturing cost, permits operation with lean gases whose heating value lies below the minimum heating value required for motor operation.

This object is achieved by providing a gas supply system including a gas mixer permitting the admixture of rich gas to the lean gas in order to raise its heating value to a value suitable for the motor. By this invention, the gas motor is in continuous operation with two gases differing in heating value. As a consequence, it is possible to raise the heating value of the lean gas to the minimum value needed for motor operation by admixture of rich gas.

It is advantageous to use a gas pressure regulator to control the pressure of the rich gas flowing to the gas mixer as a function of the pressure of the lean gas at the lean gas inlet of the gas mixer. By this control, a proper mixing ratio between lean and rich gases is achieved independently of the motor power, that is, independently of the lean gas flow rate, which mixing ratio results from the ratio of cross sections between the through passage and the auxiliary line delivering the rich gas.

Preferably, the gas pressure of the rich gas in the auxiliary line connected to the gas mixer is adjustable. By this invention, fluctuations in lean gas quality, as can occur for example in the case of landfill gas, can be compensated by appropriate addition of rich gas. Furthermore, the desired heating value can be set over a wide range of quality of available lean gases.

If a rich gas pressure regulator of a rich gas control element is provided as a gas pressure regulator in the rich gas line, and if, as viewed in the flow direction, the connecting line branches from the rich gas line downstream of the rich gas pressure regulator, the rich gas pressure regulator of the type used at present in multifuel gas motors can be employed at a saving in cost.

The rich gas pressure can be regulated more accurately if the a fine gas pressure regulator is provided as gas pressure regulator, the fine gas pressure regulator being arranged in a further connecting line that, as viewed in the flow direction, branches from the rich gas line upstream of the rich gas pressure regulator, especially if the fine gas pressure regulator has a maximum flow capacity of only approximately 20% of the flow rate of lean gas.

The exactly equal upstream pressure of lean and rich gas can be achieved by virtue of the fact that the control elements of the rich gas pressure regulator or, respectively, of the fine gas pressure regulator are connected via a pulse line to the lean gas inlet of the gas mixer. In this way, the pressure of the lean gas at the lean gas inlet of the gas mixer is measured and is established as the setpoint value on the gas pressure regulator for the rich gas.

The gas motor according to the invention can be optimized because the gas pressure of the rich gas in the auxiliary line of the second gas mixer is adjustable by means of an adjustable throttle valve located downstream of the rich gas pressure regulator or, respectively, the fine gas pressure regulator. With the aid of the adjustable throttle valve, fluctuations in the heating value of the lean gas can be stabilized and thus stable running of the motor can be ensured. Furthermore, the heating value of the lean gas can be altered over a wide range.

An advantage of having a venturi mixer as the further gas mixer lies in the low pressure drop of the Venturi mixer and the resulting favorable size of the gas pressure control element.

BRIEF DESCRIPTION OF THE DRAWINGS

Further features of the invention can be inferred from the following description and the drawings in which.

DETAILED DESCRIPTION OF THE DRAWINGS

Figure 1:
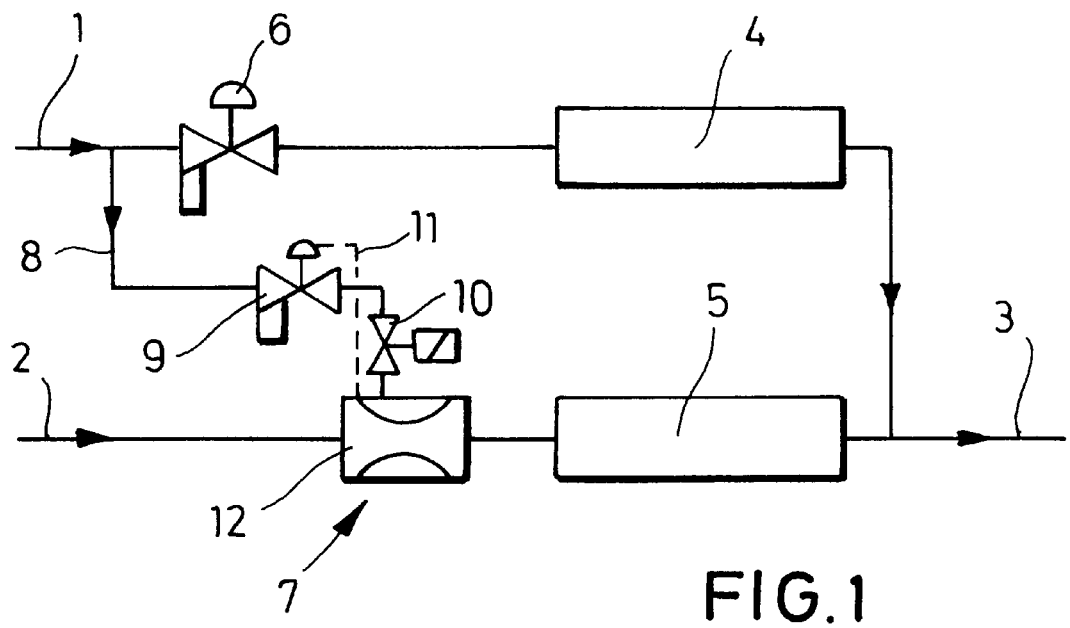
FIG. 1 is a schematic illustration of one embodiment of a multifuel gas system having a gas mixer for rich and lean gas and a fine gas pressure regulator for the rich gas to be admixed and FIG. 2 is a schematic illustration of a second embodiment of the invention which omits use of the fine gas pressure regulator.
Figure 2:
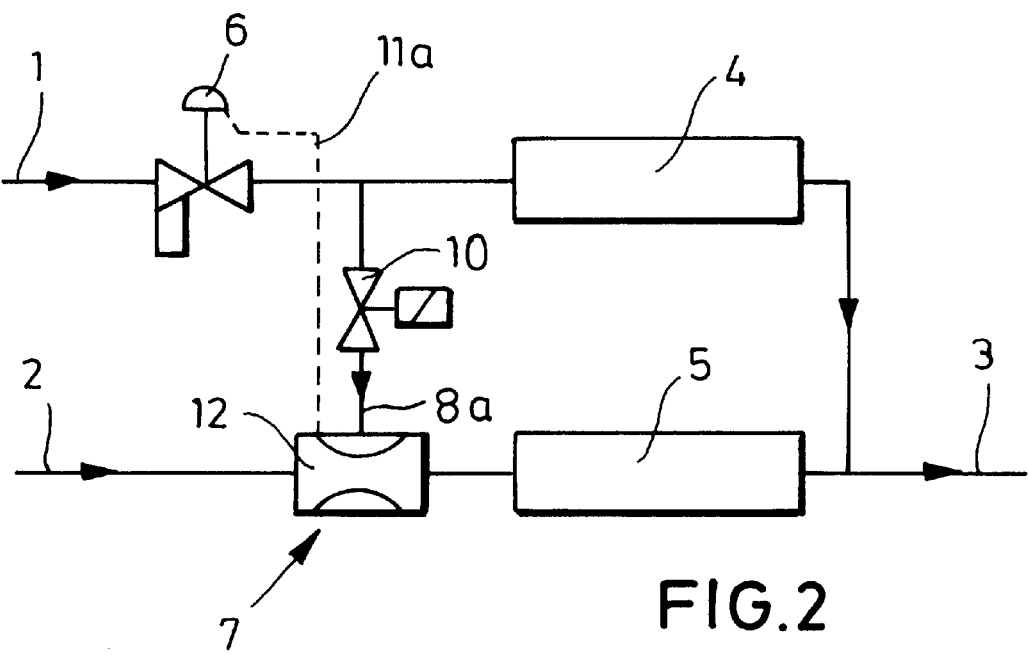

FIGS. 1 and 2 show a multifuel gas system having a rich gas line 1 and a lean gas line 2, which are connected in a common junction in fuel delivery relation to a common or first auxiliary gas line 3. The gas line 3 leads to the motor gas mixer of a gas motor, neither of which are illustrated.

Arranged in the rich gas line 1 is a rich gas control element 4, and arranged in the lean gas line 2 is a lean gas control element 5. The control elements 4, 5 each consist of a gas filter, a shutoff valve and a gas pressure regulator. Also built in is a rich gas pressure regulator 6, which lowers the pressure of the rich natural gas to the permissible inlet pressure of the rich gas control element 4.

A gas mixer 7 is arranged in the lean gas line 2 upstream of the lean gas control element 5, which gas mixer is designed as a venturi mixer. In the through passage of the gas mixer 7 there is an accelerating section for the gas flow. An auxiliary line 8, 8a, having a gas flow connection to the rich gas line 1, is connected in gas delivery relation to this accelerating section of the venturi mixer. The suction prevailing in the accelerating section, draws the rich gas from the auxiliary line 8, 8a into the through passage and there the rich gas is mixed with the lean gas.

As viewed in the flow direction, the connecting or auxiliary line 8 branches from the rich gas line 1 upstream of the rich gas pressure regulator 6 in the embodiment of FIG. 1. In the embodiment of FIG. 2, the connecting or auxiliary line 8a is connected downstream of the rich gas pressure regulator 6.

In the embodiment of FIG. 1 there is a fine gas pressure regulator 9 in the auxiliary line 8 and an adjustable throttle valve 10 installed in the auxiliary line 8 between the fine gas pressure regulator 9 and the gas mixer 7. However, in the embodiment of FIG. 2 there is only the controllable throttle valve 10 in the connecting or auxiliary line 8a.

In the embodiment of FIG. 1, one end of a pressure sensing pulse line 11 is connected to the lean gas inlet 12 of the venturi gas mixer and its other end is connected in controlling relation to the fine gas pressure regulator 9.

In the embodiment of FIG. 2, a pressure sensing pulse line 11a is connected to the lean gas inlet 12 of the gas mixer 7 and to the rich gas pressure regulator 6.

OPERATION

In normal multifuel gas operation, the throttle valves 10 of both embodiments are closed. Thus, the gas mixer 7 is not in operation as a gas mixer in the case of normal lean and rich gas operation.

In lean gas operation, only lean gas flows through to the gas motor. The rich gas line 1 remains closed by means of the shutoff valve of the rich gas control element 4.

In rich gas operation, the shutoff valve in the lean gas control element 5 is closed.

In normal multifuel gas operation, lean gas from lean-gas line 2 and rich gas from rich gas line 1 each flow into the gas line 3 and from there to the gas motor via the usual fuel delivery apparatus.

In lean gas operation with the addition of rich gas in accordance with this invention, the shutoff valve of the rich gas control element 4 is closed and the shutoff valve of the lean gas control element 5 is opened.

The pressure behind the fine gas pressure regulator 9 or, respectively, the rich gas pressure regulator 6 is adjusted, by the gas pressure in the pulse lines 11, 11a connecting the gas pressure regulators 6, 9 to the lean gas inlet 12 of the gas mixer 7, to the pressure level prevailing at the lean gas inlet 12 so that lean and rich gas are at the same pressure in the gas mixer 7. Once the regulator 9 in the FIG. 1 embodiment or the regulator 6 in the FIG. 2 embodiment has been adjusted in response to the pressure in the pulse line 11 or 11a so that the pressure of the rich gas supplied to the gas mixer is the same as the lean gas supplied via line 2, the mixing ratio of the two gases depends solely on the cross section ratio of the through passage and the auxiliary line. If the heating value of the lean gas changes, the mixture ratio will need to be changed by adjusting the throttle valve 10.

For instance, if the heat value of the lean gas decreases, the throttle valve 10 is adjusted to a larger cross section opening to allow more rich gas to flow to the second mixer 7. If the heating value of the lean gas increases the mixing ratio of the lean and rich gases is changed by adjusting the throttle valve 10 toward its closed position thereby reducing the flow of rich gas to the mixer 7, the adjustment of the throttle valve 10 to a smaller opening for rich gas flow will cause a slight pressure drop, so that the pressure of the lean gas and the rich gas are slightly different at the mixing point in the gas mixer 7. This difference causes a slight change in the mixing ratio, however, readjustment of the rich or fine gas pressure regulator 6, 9 is not necessary.

If during operation, the heating value of the lean gas changes, the delivery of rich gas to the mixer can easily be increased or decreased by adjusting the adjustable throttle valve 10. By this fuel control system, the heating value of the lean gas can be varied over a wide range.

What is claimed is:

1. In a gas motor, a fuel delivery system comprising:
   a first auxiliary line connected in gas delivery relation to said motor,
   a lean gas line (2), connected in gas delivery relation to said first auxiliary line,
   a rich gas line (1),
   a venturi gas mixer (7) having a through passage constituting part of said lean gas line (2), said through passage of said gas mixer (7) having a lean gas inlet and a gas mixing zone in which there is a suction dependent on the flow velocity prevailing in said gas mixing zone and,
   a second auxiliary line (8) connected in gas receiving relation to said rich gas line (1) and in gas delivery relation to said gas mixing zone of said gas mixer.

2. The gas motor of claim 1 and further comprising a gas pressure regulator (9) in said second auxiliary line automatically controlling the pressure of the rich gas in said second auxiliary line of said gas mixer (7) as a function of the pressure of the lean gas at said lean gas inlet (12) of said gas mixer (7).

3. The gas motor of claim 1 wherein the pressure of the rich gas in said second auxiliary line (8) connected to said gas mixer (7) is adjustable.

4. The gas motor of claim 1 and further comprising a rich gas pressure regulator (6) in said rich gas line (1) downstream of the connection of said auxiliary line (8) to said rich gas line (1).

5. The gas motor of claim 4 and further comprising a fine gas pressure regulator (9) in said second auxiliary line (8).

6. The gas motor of claim 5 wherein said fine gas pressure regulator (9) has a maximum flow capacity of approximately 20% of the flow rate of the lean gas in the lean gas line (2).

7. The gas motor of claim 5 wherein said rich gas pressure regulator (6) includes pressure control elements and further comprising a pulse line (11) connecting said control elements to said lean gas inlet (12) of said gas mixer (7).

8. The gas motor of claim 5 and further comprising an adjustable throttle valve (10) in said auxiliary line (8) downstream of said rich gas pressure regulator (6) whereby the gas pressure of the rich gas in said auxiliary line (8) of said gas mixer (7) is adjustable.

9. The gas motor of claim 1 and further comprising a rich gas pressure regulator (6) in said rich gas line upstream of the connection of said auxiliary line (8) to said rich gas line (1).

10. The gas motor of claim 9 wherein said rich gas pressure regulator (6) includes pressure control elements and further comprising a pulse line (11a) connecting said pressure control elements to said lean gas inlet (12) of said gas mixer (7).

11. The gas motor of claim 10 and further comprising an adjustable throttle valve in said auxiliary line (8a) of said gas mixer (7).

12. In a gas motor, a fuel delivery system comprising:

a first auxiliary line connected in gas delivery relation to said motor;

a lean gas line (2), connected in gas delivery relation to said first auxiliary line, a rich gas line (1), a gas mixer (7) having a through passage constituting part of said lean gas line (2), said through passage of said gas mixer (7) having a lean gas inlet (12) and a gas mixing zone in which there is a suction dependent on the flow velocity prevailing in said gas mixing zone, a second auxiliary line (8) connected in gas receiving relation to said rich gas line (1) and in gas delivery relation to said gas mixing zone of said gas mixer (7) and a gas pressure regulator (9) in said second auxiliary line (8) automatically controlling the pressure of the rich gas in said second auxiliary line (8) as a function of the pressure of the lean gas at said lean gas inlet (12) of said gas mixer (7).

13. In a gas motor, a fuel delivery system comprising:

a first auxiliary line connected in gas delivery relation to said motor, a lean gas line (2), connected in gas delivery relation to said first auxiliary line, a rich gas line (1), a gas mixer (7) having a through passage constituting part of said lean gas line (2), said through passage of said gas mixer (7) having a lean gas inlet (12) and a gas mixing zone in which there is a suction dependent on the flow velocity prevailing in said gas mixing zone and, a second auxiliary line (8) connected in gas receiving relation to said rich gas line (1) and in gas delivery relation to said gas mixing zone of said gas mixer (7) and a rich gas pressure regulator (6) in said rich gas line (1) downstream of the connection of said second auxiliary line (8) to said rich gas line (1).

14. In a gas motor, a fuel delivery system comprising:

a first auxiliary line connected in gas delivery relation to said motor, a lean gas line (2), connected in gas delivery relation to said first auxiliary line, a rich gas line (1), a gas mixer (7) having a through passage constituting part of said lean gas line (2), said through passage of said gas mixer (7) having a lean gas inlet (12) and a gas mixing zone in which there is a suction dependent on the flow velocity prevailing in said gas mixing zone, a second auxiliary line (8) connected in gas receiving relation to said rich gas line (1) and in gas delivery relation to said gas mixing zone of said gas mixer (7)

a rich gas pressure regulator (6) in said rich gas line (1) downstream of the connection of said auxiliary line (8) to said rich gas line (1), said rich gas pressure regulator (6) including pressure control elements, a pulse line (11) connecting said pressure control elements to said lean gas inlet (12) of said gas mixer (7) and a fine gas pressure regulator (9) in said second auxiliary line (8).

* * * * *